United States Patent Office 3,654,368
Patented Apr. 4, 1972

3,654,368
N,N-DIALKYL-α-AMINOACETYLENE THIOETHERS
Heinz G. Viehe, Linkebeek, and Serge V. Delavarenne, Wemmel, Belgium, assignors to Union Carbide Corporation, New York, N.Y.
No Drawing. Continuation-in-part of application Ser. No. 624,135, Mar. 20, 1967. This application Feb. 24, 1970, Ser. No. 14,719
Int. Cl. C07c 87/06, 149/24
U.S. Cl. 260—583 EE         3 Claims

ABSTRACT OF THE DISCLOSURE

N,N-disubstituted α-aminoacetylene thioethers (ynamine thioethers) are prepared by the reaction of N,N-disubstituted alkali amides and dihalovinylthioethers. The thioethers are useful as water accepting agents in condensation reactions.

---

This application is a continuation-in-part of Ser. No. 624,135, filed Mar. 20, 1967, and now abandoned.

This invention relates to novel thioethers. In one aspect, this inveniotn relates to novel N,N-disubstituted α-aminoacetylene thioethers. In a further aspect, this invention is directed to a novel process for the preparation of N,N-disubstituted-α-aminoacetylene thioethers.

In recent years, numerous articles have appeared in the literature directed to acetylenic nitrogen-containing compounds and methods of preparation. Certain of these compositions, often referred to as aminoacetylenes or "ynamine," had previously been described in the literature. For example, 1-phenyl-2-diethylaminoacetylene has been described in Liebigs Ann. Chem. 1960, 638 pages 36 and 41. More recently, various reactions involving ynamines have been reported by H. G. Viehe, R. Fuks and M. Reinstein Angew. Chem. International edition 3, 581 (1964) and R. Buijle and H. G. Viehe Anew. Chem. 13, 572 (1964). However, to date, the majority of reported aminoacetylenes are confined to those having hydrocarbon substituents on the carbon of the acetylenic group.

It has now been discovered that the novel class of α-aminoacetylene thioethers can be conveniently prepared by a simple, one-step reaction. The process of this invention provides route to heretofore unknown aminoacetylenes having a sulfur atom bonded directly to one of the carbon atoms of the acetylenic group and a nitrogen atom bonded to the other. As hereinafter indicated, the novel aminoacetylene thioethers of this invention are particularly useful for a wide variety of applications.

It is therefore an object of this invention to provide novel acetylenic sulfur-containing compounds. Another object of this invention is to provide novel N,N-disubstituted α-aminoacetylene thioethers. A further object is to provide novel N,N-disubstituted α-aminoacetylene thioethers which are useful in a wide variety of fields. A still further object is to provide a novel process for the preparation of the aforementioned acetylenic thioethers in relatively high yields and from accessible starting materials. These and other objects will readily become apparent to those skilled in the art in the light of the teachings herein set forth.

In its broad aspect, the present invention is directed to novel N,N - disubstituted α - aminoacetylene thioethers. These compositions can be conveniently represented by the following formula:

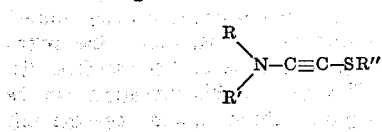

wherein R, R' and R" individually represent aliphatic, cycloaliphatic, aromatic or heterocyclic groups. Preferred compositions which can be prepared in accordance with the teachings of this invention include those wherein each R variable represents a monovalent hydrocarbon group or the R and R' groups can together form a cyclic heterocyclic or polycyclic group with the nitrogen atom to which they are attached. Also preferred are the thioethers represented by the above formula wherein R, R' and R" contain up to 24 and preferably up to 12 carbon atoms, are composed of carbon hydrogen and in some instances, at least one other element selected from the group consisting of oxygen, nitrogen, sulfur and halogen. Particularly preferred thioethers are those wherein R, R' and R" individually represent alkyl, alkenyl, alkoxyalkyl, aryl, alkaryl, aralkyl, alkoxyaryl, alkoxyaralkyl, cycloalkyl, cycloalkenyl, haloalkyl, haloaryl, haloalkaryl, aminoalkyl, alkylaminoalkyl, dialkylaminoalkyl, dialkylaminoalkoxyalkyl carboxy alkyl, carboxyaryl, carboalkoxyalkyl, carboalkoxyaryl, amidoalkyl, alkylamidoalkyl, arylamidoalkyl, carbamidoalkyl, alkylcarbamidoalkyl, or R and R' can toegther with the nitrogen atom to which they are attached represent, pyridyl, pipyridyl, morpholinyl, and the like.

Illustrative N,N-disubstituted α-aminoacetylene thioethers encompassed by the aforementioned formula include, among others, 1-(N,N-dimethylamino)-2-ethylthioacetylene,
1-(N,N-dimethylamino)-2-N-butylthioacetylene,
1-(N,N-diethylamino)-2-ethylthioacylene,
1-(N,N-diethylamino)-2-n-butylthioacetylene,
1-(N,N-diethylamino)-2-isopropylthioacetylene,
1-(N,N-diethylamino)-2-phenylthioacetylene,
1-(N,N-diethylamino)-2-(p-methylphenylthio)acetylene,
1-pipyridiyl-2-ethylthioacetylene,
1-(N-methyl-N-phenylamino)-2-ethylthioacetylene,
1-(N-methyl-N-phenylamino)-2-(p-methylphenylthio) acetylene,
1-(N,N-dimethylamino)-2-phenylthioacetylene,
1-(N,N-dichloropropylamino)-2-phenylthioacetylene,
1-(N,N-dipropoxymethylamino)-2-ethylthioacetylene,
1-(N,N-dimethoxyphenylamino)-2-phenylthioacetylene,
1-(N,N-diethylamino)-2-(p-methoxyphenylthio) acetylene, and the like.

In practice, the novel N,N-disubstituted α-aminoacetylene thioethers of this invention are prepared by the reaction of an alkaline earth or alkali N,N-disubstituted amide and dihalovinylthioethers in accordance with the reaction.

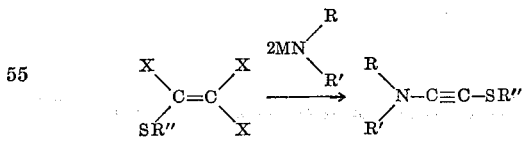

wherein R, R' and R" have the same value as previously indicated M represents an alkaline earth or alkali metal, and any two X's represent halogen, the third X representing hydrogen. Preferred dihalovinylthioethers are the 1,2-dichlorovinylthioethers although the 2,2-dichlorovinylthioethers can also be employed to give the same product.

Generally, the reaction is effected by contacting the dihalovinylthioether and the alkaline earth or alkali N,N-disubstituted amide in the presence of an inert organic solvent and under an inert atmosphere such as nitrogen. Preferably the alkaline earth or alkali N,N-disubstituted amide is added dropwise to a solution of the dihalovinylthioether. After the reaction is complete, the desired product can be separated by filtration and purified by conventional techniques.

Solvents which can be employed include the aprotic solvents such as hydrocarbons, e.g., hexane, benzene, toluene, xylene and the like, hydrocarbon ethers, e.g., diethyl ether and the like.

It has been found that optimum results are obtained when the reaction is conducted at low temperatures without the use of external heat. However, temperatures from as low as about —80° C. up to the distillation temperature of the product have been employed. A preferred temperature range is from about —80° C. up to about 25° C.

As hereinbefore indicated, the starting materials employed in the preparation of the compositions of this invention are the dihalovinylthioethers and alkaline earth or alkali N,N-disubstituted amides. The dihalovinylthioethers can be either the 1,2-dihalovinylthioethers or the 2,2-dihalovinylthioethers. Typical thioethers which can be employed include, among others, 1-ethylthio-1,2-dichloroethylene, 1-n-butylthio-1,2-dichloroethylene, 1-isoproylthio-1,2-dichloroethylene, 1-phenylthio-1,2-dichloroethylene, 1-p-methoxyphenylthio-1,2-dichloroethylene, 1-ethylthio-2,2-dichloroethylene, 1-n-butylthio-2,2-dichloroethylene, 1-isopropylthio-2,2-dichloroethylene, 1-phenylthio-2,2-dichloroethylene, 1-p-methoxyphenylthio-2,2-dichloroethylene, 1-methylthio-1,2-dibromoethylene, 1-phenylthio-1,2 - diiodoethylene, 1 - p-methylphenylthio-2,2-dibromoethylene, and the like.

The N,N-disubstituted amides employed include the alkaline earth or alkali N,N-disubstituted amides. Typical examples include lithium N,N-dimethylamide, sodium N,N-diethylamide, potassium N,N-dipropylamide, lithium N-methyl-N-propyl amide, lithium N,N-diphenyl amide, lithium N-methyl-N-phenyl amide, lithium N-ethyl-N-p-methoxyphenyl amide, lithium piperidine, lithium N-chloropentyl-N-octyl amide, and the like. The lithium N,N-disubstituted amides are preferred.

elements of water, namely, two hydrogen atoms and an oxygen atom are eliminated between two functional groups with the formation of a new chemical bond. A typical condensation reaction is the reaction of acetic acid and ethyl alcohol to produce ethyl acetate and water.

The use of the N,N-disubstituted α-aminoacetylene thioethers as water accepting agents improves the efficiency of such condensation reactions. Moreover, the use of the thioethers of this invention permits the use of milder reaction conditions and greatly increases the yield of the condensation product. Furthermore, the aminoacetylene are superior as water accepting agents to any other water accepting agents heretofore known.

The following examples are illustrative:

EXAMPLE 1

Preparation of 1-ethylthio-2-(N,N-dimethylamino) acetylene

To a stirred solution of one equivalent of 1,2-dichlorovinylethylthioether in one volume of anhydrous ether was added dropwise at —78° C. and under a nitrogen atmosphere, a suspension of two equivalents of lithium N,N-dimethylamide. The reaction mixture was allowed to attain room temperature and was kept at this temperature for about 6 hours, after which it was filtered. After evaporation of the solvents, the residue was distilled in vacuum and gave the 1-ethylthio-2-(N,N-dimethylamino) acetylene. The chemical analysis and other pertinent data are set forth in Table I.

EXAMPLES 2–11

In a manner similar to that employed in Example 1, 1,2-dichlorovinylthioethers were reacted with the appropriate lithium amide to provide other novel N,N-disubstituted α-aminoacetylene thioethers. The yield, elemental analysis, infrared spectra and boiling points are set forth in Table I below:

TABLE I

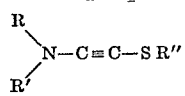

| | | | | | | Analysis | | | | | | |
|---|---|---|---|---|---|---|---|---|---|---|---|---|
| | | | | | | Calculated | | | Found | | | IR(C≡C str. |
| Example | Formula | R | R' | R'' | BP., deg./mm. | Yield, percent | C | H | N | C | H | N | vibration |
| 1 | C$_6$H$_{13}$NS | CH$_3$ | CH$_3$ | C$_2$H$_5$ | 50–55/1 | 58 | 55.75 | 8.58 | 10.82 | 55.44 | 8.64 | 10.53 | Doublet 4,5 and 4,7μ |
| 2 | C$_8$H$_{15}$NS [1] | CH$_3$ | CH$_3$ | nC$_4$H$_9$ | 90–95/0.5 | 90 | 59.65 | 10.51 | 13.91 | 59.0 | 10.76 | 13.25 | |
| 3 | C$_6$H$_{13}$NS | C$_2$H$_5$ | C$_2$H$_5$ | C$_2$H$_5$ | 56–70/0.1 | 50 | 61.0 | 9.62 | 8.90 | 60.3 | 9.53 | 8.40 | 4.70μ |
| 4 | C$_{10}$H$_{19}$NS | C$_2$H$_5$ | C$_2$H$_5$ | nC$_4$H$_9$ | 105–110/0.5 | 35 | 64.8 | 10.33 | 7.55 | 64.45 | 10.12 | 7.59 | 4.70μ |
| 5 | C$_9$H$_{17}$NS | C$_2$H$_5$ | C$_2$H$_5$ | iso-C$_3$H$_7$ | 70–75/0.01 | 50 | 63.10 | 10.0 | 8.17 | 62 | 9.92 | 7.96 | 4.70μ |
| 6 | C$_{12}$H$_{15}$NS | C$_2$H$_5$ | C$_2$H$_5$ | C$_6$H$_5$ | 110–115/0.01 | 68 | 70.2 | 7.36 | 6.82 | 70.27 | 7.13 | 6.97 | 4.70μ |
| 7 | C$_{13}$H$_{17}$NS | C$_2$H$_5$ | C$_2$H$_5$ | p-C$_6$H$_4$CH$_3$ | 80–83/0.001 | 70 | 71.18 | 7.81 | | 71.21 | 7.97 | | 4.70μ |
| 8 | C$_9$H$_{15}$NS | (²) | (²) | C$_2$H$_5$ | 90–95/0.1 | 60 | 63.8 | 8.93 | 8.27 | 63.0 | 8.89 | 7.80 | 4.70μ |
| 9 | C$_{11}$H$_{13}$NS | CH$_3$ | C$_6$H$_5$ | C$_2$H$_5$ | 80–85/0.1 | 50 | 69.07 | 6.85 | 7.32 | 69.25 | 6.99 | 7.22 | 4.70μ |
| 10 | C$_{16}$H$_{15}$NS | CH$_3$ | C$_6$H$_5$ | p-C$_6$H$_4$CH$_3$ | ³ 98–99 | 63 | 75.85 | 5.97 | 5.53 | 75.86 | 6.06 | 5.20 | 4.70μ |
| 11 | C$_{10}$H$_{11}$NS | CH$_3$ | CH$_3$ | C$_6$H$_5$ [1] | 130–135/1 | 55 | 64.81 | 8.16 | 12.60 | 65.19 | 8.03 | 11.46 | |

[1] These compounds were isolated as thio-ketene N,N,-acetals formed by the addition of one mole of

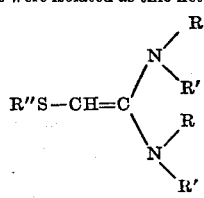

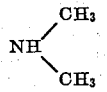

on the corresponding ynamine thioether.

² R and R' together form N$\overset{\displaystyle\frown}{\phantom{xx}}$

³ M.P.

The novel N,N-disubstituted α-aminoacetylene thioethers are useful water accepting agents in condensation reactions, that is, chemical reactions in which water is eliminated between two functional groups with the formation of a new chemical bond. Condensation reactions are more generally defined as those reactions in which the Although the invention has been illustrated by the preceding examples it is not to be construed as being limited to the materials employed therein, but rather, the invention encompasses the generic area as hereinbefore disclosed. Various modifications of this invention can be made without departing from the spirit and scope thereof.

What is claimed is:

1. N,N-disubstituted α-aminoacetylene thioether of the formula:

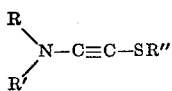

wherein R, R' and R" represent alkyl of up to 12 carbon atoms.

2. The N,N-disubstituted-α-aminoacetylene thioether of claim 1 which is 1-(N,N-dimethyl amino)-2-ethylthioacetylene.

3. The N,N-disubstituted-α-aminoacetylene thioether of claim 1 which is 1-(N,N-diethylamino)-2-ethylthioacetylene.

References Cited

UNITED STATES PATENTS 2,816,094  12/1957  Melamed et al. ____ 260—583 X

FLOYD D. HIGEL, Primary Examiner

U.S. Cl. X.R.

260—247.1, 293.4 R, 294.8 G, 488 F, 563 R, 570.5 S, 577, 584 C, 609 A, 609 E, 609 F, 684